(12) United States Patent
Matsuo et al.

(10) Patent No.: US 6,845,857 B2
(45) Date of Patent: Jan. 25, 2005

(54) PARALLEL SHAFT REDUCTION GEAR

(75) Inventors: Naoki Matsuo, Kurashiki (JP); Kazunari Saiki, Kurashiki (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/423,032

(22) Filed: Apr. 25, 2003

(65) Prior Publication Data

US 2003/0226414 A1 Dec. 11, 2003

(30) Foreign Application Priority Data

Apr. 26, 2002 (JP) .................. 2002-126299

(51) Int. Cl.[7] ................ F16H 1/02; B60K 41/26
(52) U.S. Cl. ...................... 192/223; 74/411.5
(58) Field of Search ............. 74/412 R, 411.5, 74/414; 192/223, 223.2

(56) References Cited

U.S. PATENT DOCUMENTS

| 3,734,254 A | * | 5/1973 | Yanikoshi | 192/223.1 |
| 3,802,289 A | * | 4/1974 | Cheek | 74/411.5 |
| 4,108,291 A | * | 8/1978 | Zenker | 74/411.5 |
| 4,577,524 A | * | 3/1986 | Richards et al. | 74/411.5 |
| 4,697,675 A | * | 10/1987 | Johnson et al. | 192/223 |
| 5,063,808 A | * | 11/1991 | Hill | 74/411.5 |

* cited by examiner

Primary Examiner—Rodney H. Bonck
(74) Attorney, Agent, or Firm—Squire, Sanders & Dempsey L.L.P.

(57) ABSTRACT

A parallel shaft reduction gear with a backstop mechanism superior in replacement and maintenance operations is provided. The parallel shaft reduction gear that is used in combination with a motor and equipped in a gear case with primary-stage shafts which are disposed axially parallel to an output shaft. The output shaft and the primary-stage shaft are rotatably supported by bearings on the motor side and on the opposite side of the motor side with respect to the gear case, respectively. The backstop mechanism that prevents reverse rotation of the output shaft is installed in any one of the output shaft and the primary-stage shaft on the axially outside of the corresponding opposite motor side bearing (lower side in the figure).

3 Claims, 4 Drawing Sheets

PARALLEL SHAFT REDUCTION GEAR

BACKGROUND OF THE INVENTION

1. Field of the Invention

The present invention relates to parallel shaft reduction gears used in, for example, cooling tower fan drives, and particularly to a parallel shaft reduction gear equipped with a backstop mechanism for preventing reverse rotation of the output shaft thereof.

2. Description of the Related Art

There are parallel shaft reduction gears each used together with a motor and equipped with a backstop mechanism such as a one-way clutch for preventing reverse rotation of the output shaft thereof.

FIG. 4 is a fragmentary enlarged view illustrating a sprag type one-way clutch as an example of the backstop mechanism.

This one-way clutch 100 is a publicly-known mechanism, having cams 106 in between an inner ring 102 and an outer ring 104. If the outer ring 104 is secured to a casing (not shown), the rotation of the inner ring 102 is limited to one direction (direction R in the figure), and the cams 106 prevent the reverse rotation of the inner ring 102.

If such a backstop mechanism capable of limiting the direction of rotation is installed in one of the rotary shafts constituting the reduction gear, the reverse rotation of the output shaft is prevented and only rotation of the normal direction is transmitted to the target object to be driven.

Conventional parallel shaft reduction gears equipped with such a backstop mechanism are, however, not designed to provide easy maintenance for the backstop mechanism. For replacing/repairing the backstop mechanism, the motor and other peripheral hardware must be all removed, and changeover and maintenance are not easy to perform.

SUMMARY OF THE INVENTION

The present invention has been made to solve these problems, and one object of the present invention is to provide a parallel shaft reduction gear equipped with a backstop mechanism that is easy to replace and maintain.

The present invention provides a parallel shaft reduction gear that is used in combination with a motor and has at least one primary-stage shaft disposed axially parallel to an output shaft in a gear case. The output shaft and the primary-stage shaft are rotatably supported by bearings on the motor side and on the opposite side of the motor side with respect to the gear case, respectively. A backstop mechanism for preventing reverse rotation of the output shaft is installed in any one of the output shaft and the primary-stage shaft on axially outside of the corresponding opposite motor side bearing.

According to the invention, since the backstop mechanism is installed on the opposite side of the motor beyond the bearing outwardly, the installation/removal of the motor, which is rather time and labor consuming, becomes unnecessary when replacing/repairing the backstop mechanism. Thus, it is possible to provide a parallel shaft reduction gear of which backstop mechanism is easy to replace and maintain.

If the reduction gear further includes an oil pump, which circulates oil in the parallel shaft reduction gear, in the shaft equipped with the backstop mechanism, and if the backstop mechanism is disposed between the oil pump and the opposite motor side bearing, the backstop mechanism can be replaced/repaired only by removing the oil pump that is easy to install and remove.

If the backstop mechanism is installed in the shaft disposed most upstream to the input side among a plurality of the primary-stage shafts (namely, the input shaft), the backstop mechanism is installed in the shaft that rotates at the lowest torque. Because the load applied to the backstop mechanism from the rotary shaft is reduced, even a small backstop mechanism can sufficiently prevent reverse rotation. Then the backstop mechanism is downsized, and its production cost is reduced.

Furthermore, it is also preferable that the opposite motor side bearing of the shaft equipped with the backstop mechanism is assembled inwardly than the opposite motor side bearing of the other one of the shafts which is parallel to the shaft equipped with the backstop mechanism. It is also preferable that the gear case has an installation face in a part of a face equipped with the oil pump, and the oil pump is disposed axially inward than the installation face. Then, the backstop mechanism or the oil pump need not project from the installation face of the parallel shaft reduction gear, even when the backstop mechanism and the oil pump are disposed in the shaft on the axially outside of the bearing on the opposite side of the motor. Therefore, it becomes easy to carry and mount the parallel shaft reduction gear.

If a small-diameter part is formed on the shaft equipped with the backstop mechanism, which part is smaller than the inner diameter of the opposite motor side bearing of the shaft and positioned on the axially outside of the opposite motor side bearing, and if the backstop mechanism is installed in this small-diameter part, the backstop mechanism can be downsized without sacrificing the reverse rotation preventing function.

DESCRIPTION OF THE PREFERRED EMBODIMENTS

Now the preferred embodiments of the invention will be described with reference to the accompanying drawings.

Figure 1:
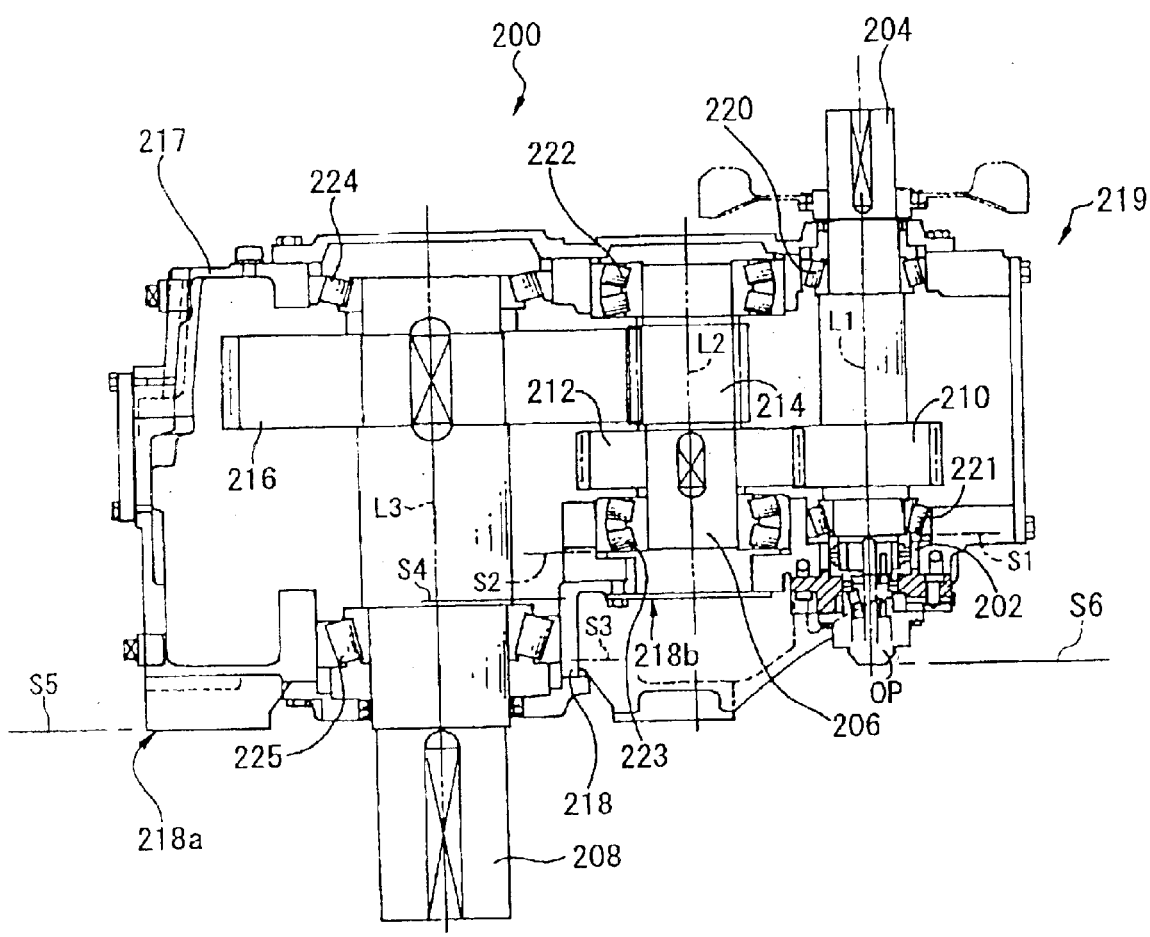
Fig. 1 is a sectional side view of a parallel shaft reduction gear according to an embodiment of the invention.

FIG. 1 is a sectional side view illustrating a parallel shaft reduction gear 200 according to the embodiment of the invention.

The parallel shaft reduction gear 200 has an input shaft 204 (first primary-stage shaft) coupled with the shaft of a motor (not shown), an intermediate shaft 206 (second primary-stage shaft), and an output shaft 208.

The input shaft 204 is supported by a motor side bearing 220 (namely, one of the bearings 220, 221 rotatably supporting the input shaft 204, disposed on the side (upper side in FIG. 1) where the motor is installed), and an opposite motor side bearing 221 disposed on the opposite side of the motor side bearing 220 (lower side in FIG. 1). This input shaft 204 can rotate around a shaft center L1. Further, the input shaft 204 has a first gear 210, an oil pump OP, and a backstop mechanism 202. The peripheral structure of the backstop mechanism 202 will be described later.

The intermediate shaft 206 is rotatably supported by a motor side bearing 222 and an opposite motor side bearing 223, and can rotate around a shaft center L2 that is parallel to the shaft center L1 of the input shaft 204. The intermediate shaft 206 has a large second gear 212 that meshes with the first gear 210 assembled on the input shaft 204, and a third gear 214 which is smaller in diameter than that of the second gear 212.

The output shaft 208 is rotatably supported by a motor side bearing 224 and an opposite motor side bearing 225, and can rotate around a shaft center L3 that is parallel to the shaft center L1 of the input shaft 204. The output shaft 208 has a fourth gear 216 that meshes with the third gear 214 assembled on the intermediate shaft 206.

These shafts (input shaft 204, intermediate shaft 206, and output shaft 208) and gears 210, 212, 214, and 216 are housed in a gear case 219 which comprises an upper casing 217 and a lower casing 218.

The installation position S1 of the opposite motor side bearing 221 of the input shaft 204 and the installation position S2 of the opposite motor side bearing 223 of the intermediate shaft 206 are assembled inwardly in the axial direction L1, L2, than a position S3 where the opposite motor side bearing 225 of the output shaft 208 is seated (upper side in FIG. 1). The lower casing 218 has a recess part 218b inward from the installation face 218a of the parallel shaft reduction gear 200, according to the positions S1, S2 of the opposite motor side bearings 221, 223. The position S4 of the recess part 218b is axially inward than the position S5 of the installation face 218a. Furthermore, the installation position S6 of the oil pump OP is also inward in the axial direction than the position S5 of the installation face 218a.

Figure 2:
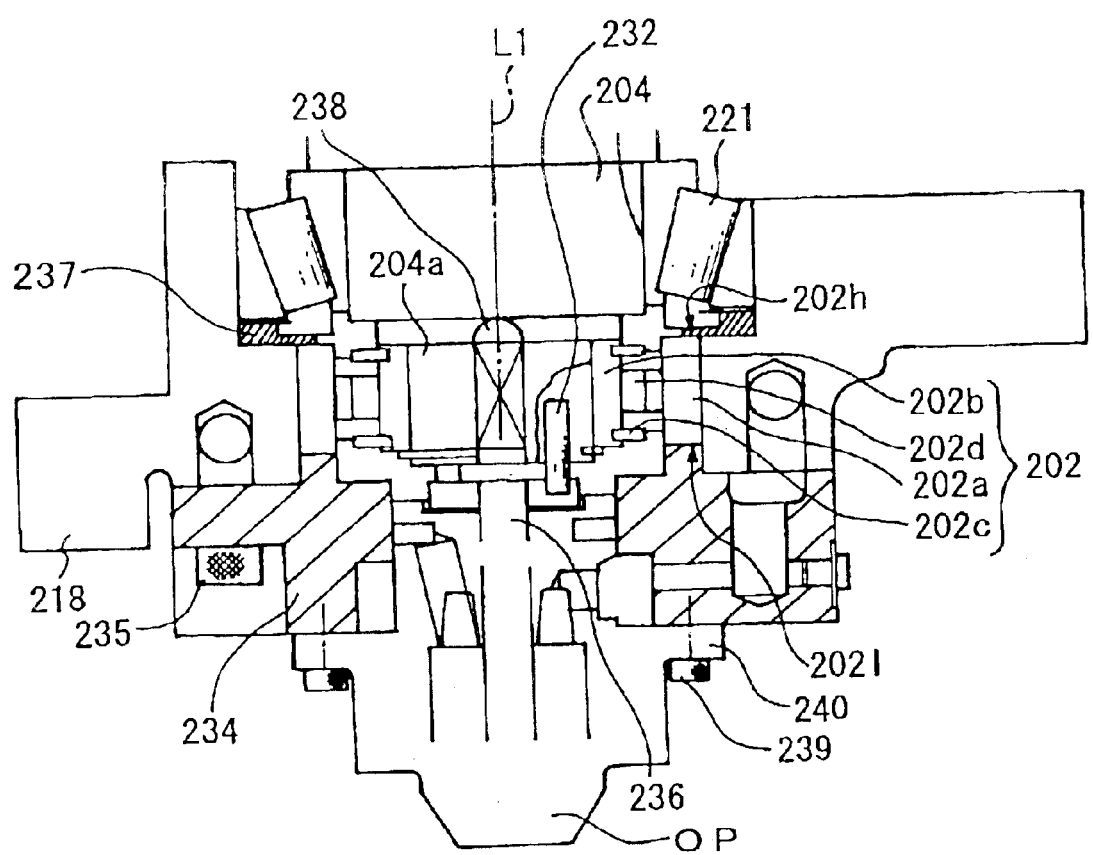
FIG. 2 is an enlarged partial view of the vicinity of the backstop mechanism of FIG. 1.
Figure 3:
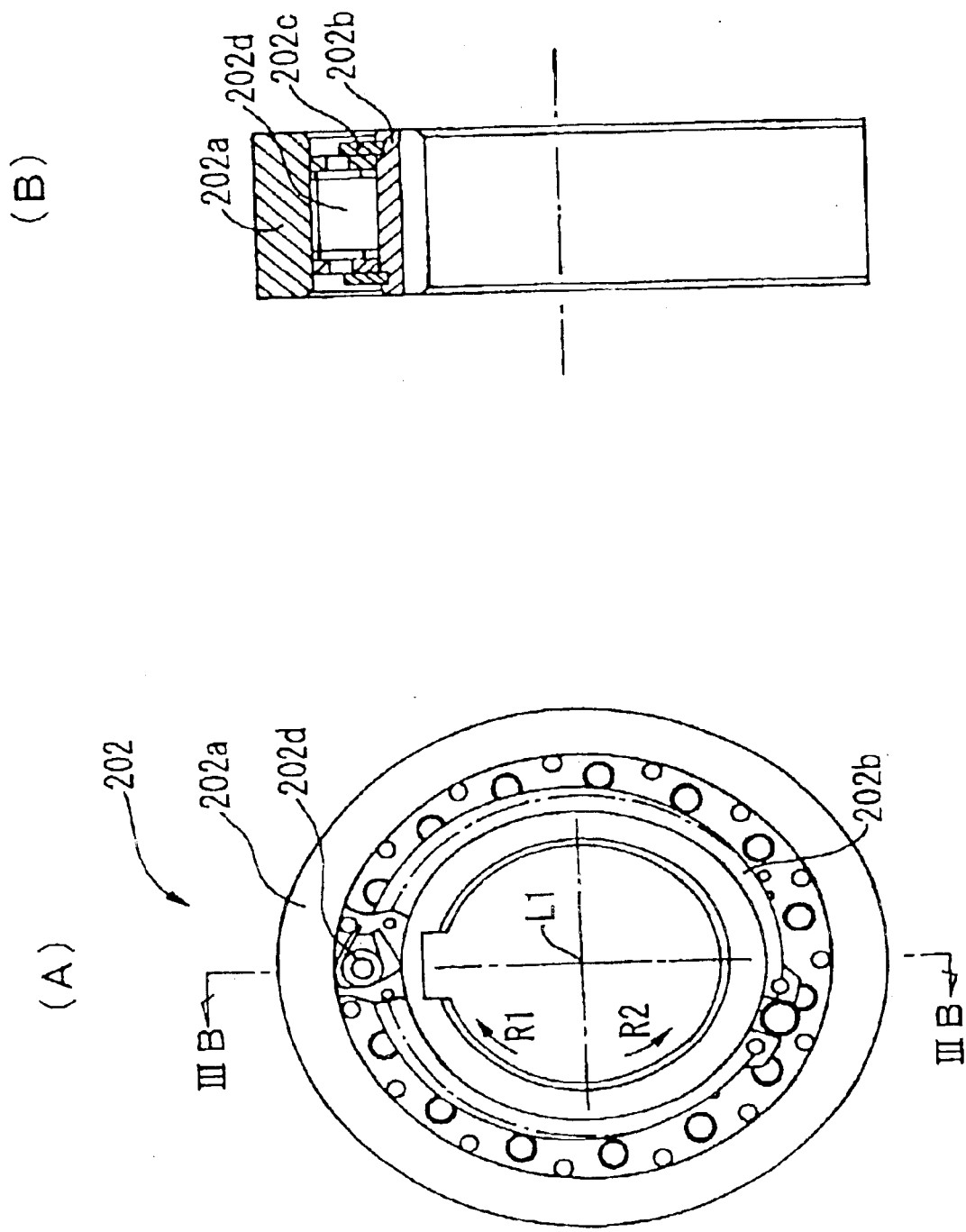
FIG. 3A is a front view of the backstop mechanism of FIG. 1.
FIG. 3B is a sectional view taken along the line IIIB—IIIB in FIG. 3A.
Figure 4:
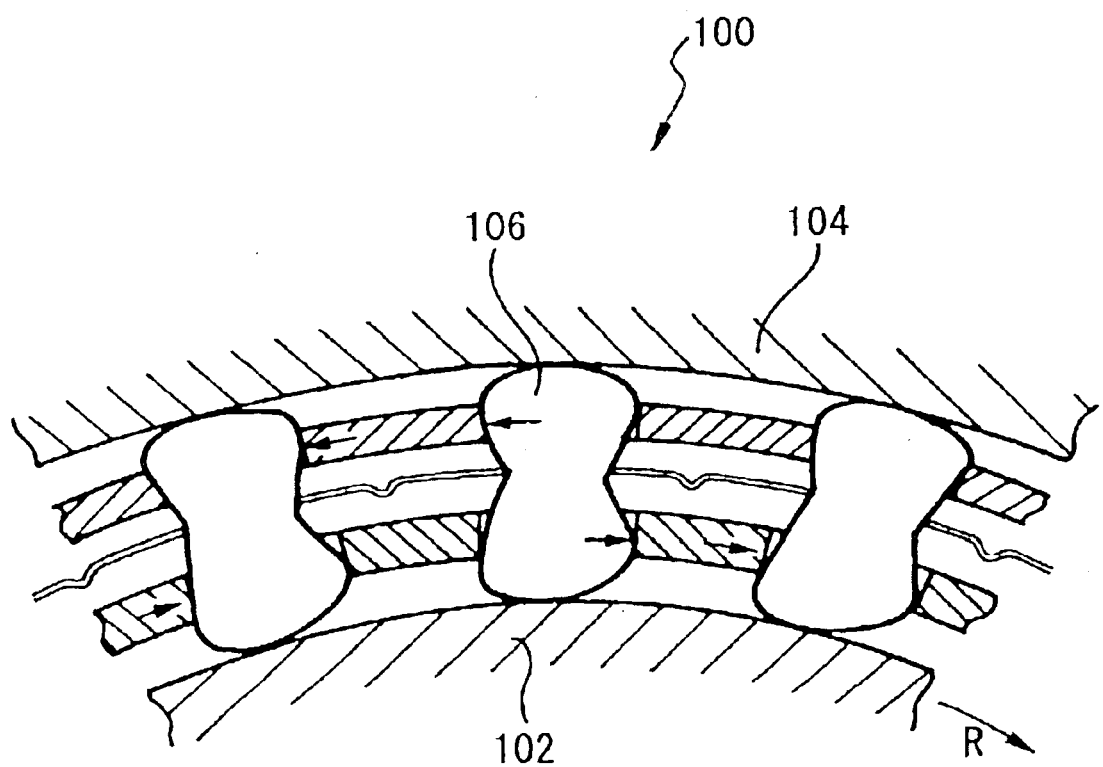
FIG. 4 is an enlarged partial view of a sprag type one-way clutch.

Now the backstop mechanism 202 is described in detail with reference to FIGS. 2 and 3. FIG. 2 is an enlarged partial view illustrating the vicinity of the backstop mechanism 202 of the parallel shaft reduction gear 200 shown in FIG. 1. FIG. 3A is a front view of the backstop mechanism 202, and FIG. 3B is a sectional view taken along the line IIIB—IIIB in FIG. 3A.

The backstop mechanism 202 is disposed between the opposite motor side bearing 221 of the input shaft 204 and the oil pump OP. The backstop mechanism 202 is installed in a small-diameter part 204a on the lower end side (lower side in FIG. 2) of the input shaft 204. More specifically, the upper part 202h of the outer ring 202a of the backstop mechanism 202 is in contact with a spacer 237 disposed under the opposite motor side bearing 221 of the input shaft 204. The lower part 202l of the backstop mechanism 202 is in contact with an installation cover 234 of the oil pump OP. This installation cover 234 is fastened with bolts 235 to the lower casing 218.

The movable part 236 of the oil pump OP is connected to the input shaft 204 with driver pins 232, while the fixed part 240 is fastened to the installation cover 234 with bolts 239.

In this example, the backstop mechanism 202 is what is called the sprag type, mainly comprises an outer ring 202a, an inner ring 202b, a snap ring 202c, and a cam 202d.

The outer ring 202a is in contact with the lower casing 218. The inner ring 202b is connected to the input shaft 204 with a key 238, and can rotate together with the input shaft 204 around the shaft center L1.

A cam 202d is disposed between the outer ring 202a and the inner ring 202b. The cam 202d works on the outer ring 202a to cause deformation there, so that the outer ring 202a is fastened to the lower casing 218. The inner ring 202b can rotate only in one direction (direction R1 in FIG. 3A) against the fixed outer ring 202a, while cannot rotate in the opposite direction (direction R2 in FIG. 3A).

Next the operation of the parallel shaft reduction gear 200 according to the embodiment of the invention is explained.

As the motor rotates, the input shaft 204 connected to the motor shaft and the first gear 210 on the input shaft 204 rotate around the shaft center L1. As the first gear 210 rotates, the second gear 212 engaging with the first gear 210 and the third gear 214 on the intermediate shaft 206 shared with the second gear 212 rotate around the shaft center L2. As the third gear 214 rotates, the fourth gear 216 engaging with the third gear 214 and the output shaft 208 equipped with the fourth gear 216 rotate around the shaft center L3. The output shaft 208 thereby transmits torque.

As the input shaft 204 rotates, the inner ring 202b of the backstop mechanism 202 connected the input shaft 204 rotates together. Then the rotation of the input shaft 204 is not limited because the inner ring 202b is set to rotate in the normal direction (direction R1 in FIG. 3A) of the input shaft 204. Therefore, the torque of the input shaft 204 is all transmitted to the output shaft 208 via the intermediate shaft 206.

Meanwhile, if a rotational load is applied to the output shaft 208 in the reverse direction from a device (not shown) to be driven, the torque is conveyed to the input shaft 204 via the intermediate shaft 206. However, since the inner ring 202b of the backstop mechanism 202 installed in the input shaft 204 is configured not to rotate in the reverse direction (direction R2 in FIG. 3A). As a result, the rotation of the input shaft 204 is restricted, and thereby the reverse rotations of the intermediate shaft 206 and the output shaft 208 are prevented.

The oil pump OP connected to the input shaft 204 is driven by the rotation of the input shaft 204 to circulate lubricating oil in the parallel shaft reduction gear 200.

In general, the oil pump OP is required to be installed in the shaft that rotates fastest (namely the input shaft 204) for higher operating efficiency. This requirement may pose a problem to the backstop mechanism 202 of the embodiment. However, by installing the backstop mechanism 202 in between the oil pump OP and the opposite motor side bearing 221, a sufficient amount of lubricating oil can be provided to the backstop mechanism 202 which has a mechanically complex structure.

Furthermore, since the backstop mechanism 202 is installed on the axially outside of the bearing 221 on the opposite side of the motor (lower side in FIG. 1), the installation/removal of the motor, which is relatively time and labor consuming, becomes unnecessary when replacing/repairing the backstop mechanism 202. The backstop mechanism 202 can be replaced/repaired only by removing the oil pump OP which is easy to remove and install. Accordingly, a parallel shaft reduction gear 200 equipped with a backstop mechanism 202 superior in replacement and maintenance operations can be provided.

The backstop mechanism 202 is installed in the input shaft 204, which exists most upstream to the input side in the primary-stage shafts (input shaft 204 and intermediate shaft 206). In other words, the backstop mechanism 202 is installed in the shaft (204) which can rotate with the lowest torque. Then the load applied to the backstop mechanism 202 is relatively low, and thus even a small backstop mechanism 202 can sufficiently prevent reverse rotation. As a result, the reduction gear can be downsized.

Furthermore, the opposite motor side bearing 221 of the input shaft 204 and the opposite motor side bearing 223 of the intermediate shaft 206 are assembled inwardly in the axial direction L1, L2 (upper side in FIG. 1) than the opposite motor side bearing 225 of the output shaft 208. Then the backstop mechanism 202 and the oil pump OP can be incorporated in a space between the recess part 218b of the lower casing 218 and the installation face 218a of the parallel shaft reduction gear 200. As a result, the backstop mechanism 202 or oil pump OP does not project beyond the installation face 218a, and it thus becomes easy to carry and mount the parallel shaft reduction gear 200.

A small-diameter part 204a that is smaller than the inner diameter of the opposite motor side bearing 221 is positioned on the axially outside of the bearing 221, and the backstop, mechanism 202 is installed in this small-diameter part 204a. Then the backstop mechanism 202 can be downsized without loss of the reverse rotation preventing effect.

While the backstop mechanism 202 has been installed in the input shaft 204 in the embodiment, it may be installed in another shaft, for example, the intermediate shaft 206. Additionally, its position for installation is not limited to the space between the opposite motor side bearing and the oil pump, as long as it is disposed on the axially outside of the opposite motor side bearing.

According to the present invention, it is possible to provide a parallel shaft reduction gear having a backstop mechanism superior in replacement and maintenance operations.

What is claimed is:

1. A parallel shaft reduction gear used in combination with a motor, comprising:

an output shaft;

at least one primary-stage shaft disposed in a gear case, the primary-stage shaft being parallel to the output shaft;

a backstop mechanism for preventing reverse rotation of the output shaft;

an opposite motor side bearing for rotatably supporting an opposite motor side of the output shaft, the opposite motor side being an opposite side of a side on which the motor is attached to the gear case; and an opposite motor side bearing for rotatably supporting an opposite motor side of the primary-stage shaft; wherein the backstop mechanism is installed in any one of the output shaft and the primary-stage shaft at a position further from the motor than the corresponding opposite motor side bearing of the shaft on which the backstop mechanism is installed and, wherein the corresponding opposite motor side bearing of the shaft equipped with the backstop mechanism is assembled at a first position along a first axis defined as being parallel to a longitudinal axis of the output shaft, wherein an opposite motor side bearing of the other one of the shafts which is parallel to the shaft equipped with the backstop mechanism is located at a second position along the first axis, and wherein the first position is closer to the motor than the second position.

2. A parallel shaft reduction gear used in combination with a motor, comprising:

an output shaft;

at least one primary-stage shaft disposed in a gear case, the primary-stage shaft being parallel to the output shaft;

a backstop mechanism for preventing reverse rotation of the output shaft;

an opposite motor side bearing for rotatable supporting an opposite motor side of the output shaft, the opposite motor side being an opposite side of a side on which the motor is attached to the gear case;

an opposite motor side bearing for rotatably supporting an opposite motor side of the primary-stage shaft; and an oil pump for circulating an oil in the parallel shaft reduction gear, the oil pump being installed in the shaft equipped with the backstop mechanism, wherein the backstop mechanism is disposed between the oil pump and the corresponding opposite motor side bearing, wherein the backstop mechanism is installed in any one of the output shaft and the primary-stage shaft at a position further from the motor than the corresponding opposite motor side bearing of the shaft on which the backstop mechanism is installed.

3. The parallel shaft reduction gear according to claim 2, wherein the gear has an installation face in a part of a face equipped with the oil pump, and the oil pump is disposed axially inward than the installation face.

* * * * *